US006177540B1

(12) United States Patent
Harlan et al.

(10) Patent No.: US 6,177,540 B1
(45) Date of Patent: Jan. 23, 2001

(54) USE OF STAR-BRANCHED POLYMERS IN PRESSURE SENSITIVE ADHESIVES

(75) Inventors: Robert D. Harlan, Somerville, NJ (US); Jules E. Schoenberg, Plano, TX (US); Christopher G. Gore, Cartersville, GA (US); Deepak Hariharan, Navi Mumbai (IN); Smita M. Shah, Edison, NJ (US)

(73) Assignee: National Starch and Chemical Investment Holding Corporation, Wilmington, DE (US)

( * ) Notice: Under 35 U.S.C. 154(b), the term of this patent shall be extended for 0 days.

(21) Appl. No.: 09/190,157

(22) Filed: Nov. 12, 1998

(51) Int. Cl.[7] .......................... C08G 63/68; C08G 75/00; C08G 75/04; B31B 31/00; C08J 7/04
(52) U.S. Cl. ..................... 528/364; 528/374; 528/376; 156/60; 156/272.2; 156/273.3; 156/275.5; 427/516
(58) Field of Search ................................. 528/364, 374, 528/376; 156/60, 272.2, 273.3, 275.5; 427/516

(56) References Cited

U.S. PATENT DOCUMENTS

| | | |
|---|---|---|
| 3,364,182 | 1/1968 | Griffith .................... 260/79 |
| 3,769,254 | 10/1973 | Anderson et al. ............ 260/33.4 PQ |
| 5,391,406 | 2/1995 | Ramharack et al. .................. 427/516 |
| 5,399,642 * | 3/1995 | Emmons et al. ..................... 526/224 |
| 5,416,127 | 5/1995 | Chandran et al. .................... 522/149 |
| 5,489,397 | 2/1996 | Bainbridge ...................... 252/174.24 |
| 5,492,965 * | 2/1996 | Emmons et al. ..................... 524/833 |
| 5,498,675 * | 3/1996 | Emmons et al. ..................... 525/537 |
| 5,536,759 | 7/1996 | Ramharack et al. .................. 522/35 |
| 5,574,117 | 11/1996 | Yoshida et al. ..................... 526/224 |
| 5,679,762 | 10/1997 | Yoshida et al. ..................... 528/364 |
| B1 3,769,254 | 2/1985 | Anderson et al. ..................... 524/398 |

FOREIGN PATENT DOCUMENTS

| | | | |
|---|---|---|---|
| 1645232 | 11/1966 | (DE) | ............... C08F/20/18 |
| 0 448 224 A1 | 9/1991 | (EP) | ................ C08F/2/38 |
| 0 449 413 A1 | 10/1991 | (EP) | ................ C08F/2/38 |
| 0 541 272 A1 | 5/1993 | (EP) | ................ C08F/2/38 |
| 2 294 467 | 5/1996 | (GB) | ............... C08F/20/14 |
| 09 53059 | 2/1997 | (JP) | ............... C09J/201/00 |
| WO 96/37520 | 11/1996 | (WO) | ................ C08F/2/38 |

OTHER PUBLICATIONS

Schaefgen and Flory, "Synthesis of Multichain Polymers and Investigation of their Viscosities", JACS, Aug. 1948, vol. 709, pp. 2709–2718.
Morton, Helminiak, Gadkary and Bueche, Prepraration and Properties of Monodisperse Branched Polystyrene, *Journal of Polymer Science*, vol. 57, pp. 471–482 (1962).
Kauder, "Thiols", *Encyclopedia of Chemical Technology*, Third Edition, vol. 22, pp. 946–964.
Jérome and Teyssié, Star–Shaped Block Copolymers. IV. Emulsifying Activity in the Water–Oil Emulsions, *Journal of Applied Polymer Science*, vol. 26, 343–351 (1981).
"Branched Polymers", *Encyclopedia of Polymer Science and Engineering*, vol. 2, pp. 478–499.
Simms and Spinelli, "Recent Advances in Group Transfer Polymerization and Their Applications In Coatings", *Journal of Coatings Technology*, vol. 59, No. 752, Sep. 1987, pp. 125–131.
Yuan and Di Silvestro, "Polymerization of methyl methacrylate in the presence of polyfunctional chain transfer agents", Macromol. Chem. Phys. 196, 2905–2913 (1995).
Erickson, Zimmerman, Southwick and Kübler, "Liquid Reactive Polymers for Radiation Curable High Performance PSAs", *Adhesives Age*, Nov. 1995.
Puts and Sogah, "Universal Multifunctional Initiator Containing Orthogonal Reactive Sites . . . " *Macromolecules* 1997, 30, 7501–7055.
Ullisch and Burchard, "Branching in Free Radical Polymerization Due to Chain Transfer . . . ", *Makromol. Chem.*, 178, 1427–1437 (1977).
European Coatings Journal, vol. 1–2/98, p. 87.
Gia et al., "Star–shaped block copolymers. II. Microemulsions stabilizers", Colloid & Polymer Science 257, 1294–1296 (1979).

* cited by examiner

Primary Examiner—James J. Seidleck
Assistant Examiner—S L. McClendon
(74) Attorney, Agent, or Firm—Thomas F. Roland (57) ABSTRACT

This invention relates to pressure sensitive adhesives, and processes of preparing such adhesives, comprising random star polymers which are crosslinked by reaction with multifunctional crosslinking agent. These adhesives can be used in coated articles.

15 Claims, 3 Drawing Sheets

USE OF STAR-BRANCHED POLYMERS IN PRESSURE SENSITIVE ADHESIVES

FIELD OF THE INVENTION

This invention relates to the use of star-branched polymers in pressure sensitive adhesive applications.

BACKGROUND OF THE INVENTION

Star-branched polymers, also known as radial polymers, are characterized by having three or more polymeric arms emanating from a central core. These polymers can be prepared by various polymerization procedures such as anionic, cationic, and free radical mechanisms. The star polymers are usually formed by using either multifunctional initiators, multifunctional chain transfer agents, or multifunctional coupling agents. The star polymers have unique properties including: narrow molecular weight distributions; low viscosities at low molecular weights or in solution due to their compact structures; and high viscosities at high molecular weights due to extensive entanglements.

U.S. Pat. No. 3,769,254 discloses pressure sensitive adhesives prepared from linear polymers of acrylic polymers containing monomers with reactive hydrogen groups. In general, high molecular weight linear polymers are usually used in high performance applications. Such polymers have solution viscosities proportional to their molecular weight. Attempts to lower the solution viscosities by reducing molecular weight results in a reduction in adhesive properties which makes them difficult to use as hot melts for high performance and coating applications. In linear systems, these lost properties cannot be recovered by crosslinking.

U.S. Pat. No. 5,679,762 discloses block star polymers which overcome some of the problems associated with a linear system. This patent is limited to block polymers which provide phase separation to attain the desired adhesive properties.

SUMMARY OF THE INVENTION

This invention relates to pressure sensitive applications comprising star polymers. Specifically to pressure sensitive applications comprising random star polymers comprising an olefinic monomer containing one or more functional groups which can be crosslinked by reaction with multifunctional crosslinking agents.

The pressure sensitive adhesive compositions of the present invention comprise an adhesive polymer formed by the reaction of a multifunctional crosslinker with a star polymer. Optional components of the adhesive polymer include other monomers containing an additional copolymerizable ethylenically unsaturated linkage as the only reactive functional group. The preferred multifunctional crosslinkers are metal compounds. With the star polymers of the present invention, high solids, low viscosity systems can be prepared with good adhesive properties and improved coatability.

DESCRIPTION OF THE FIGURES

The above and other features of the invention will be further described in the following detailed specification considered in conjugation with the accompanying drawings in which.

DETAILED DESCRIPTION OF THE INVENTION

The pressure sensitive adhesives of the present invention comprise an adhesive polymer formed by the reaction of a star polymer and multifunctional crosslinker.

The star polymers of the present invention comprise a polyvalent mercaptan core and three or more polymeric arms which extend radially from the core. The compositions of the arms themselves are random polymers.

The polyvalent mercaptan core of the present invention comprises three or more thiol groups. The thiol groups can be either all the same or all different or variations therein. It is at the thiol groups that the monomers will react to create the polymeric arms of the star polymer.

Specifically, the polyvalent mercaptan core comprises a central component, derived from a multifunctional alcohol which has been substituted with thiol derivatives. The multifunctional alcohol can have any number of functional hydroxy units, preferably three to eight functional units. To prepare the core of the present invention, each of the OH functional units will be substituted with thiol units. Accordingly, in the preferred embodiment the core compositions range from a tri-functional alcohol substituted with three identical thiol groups, up to an octa-functional alcohol substituted with eight different thiol groups.

In one embodiment of the present invention, the polyvalent mercaptan core is of the general formula:

or one of the following specific embodiments:

(I)

(II)

(III)

(IV)

(V)

(VI)

(VII)

or (VIII)

where X is derived from an organic radical having a valence of 3 to 8. Preferably, X is derived from a tri- to octamulti-functional alcohol such as glycerol, sorbitol, trimethylolpropane, pentaerythritol, dipentaerythritol, tripentaerythritol, and inositol.

Variables $Y_1$, $Y_2$, $Y_3$, $Y_4$, $Y_5$, $Y_6$, $Y_7$ and $Y_8$ are the same or different and each comprises $C_{2-10}$ alkanoic acids, preferably $C_{2-6}$ alkanoic acids. Variables a, b, c, d, e, f, g and h are integers from 0 to 8 provided that $a+b+c+d+e+f+g+h \leq 8$.

If the core is a core of differential reactivity, or heterocore, a and b are integers from 1 to 8, and c, d, e, f, g, h are integers from 0 to 8 provided that a+b+c+d+e+f+g+h≦8. If the core is a homocore, b=c=d=e=f=g=h=0.

Each of the above identified (Y-SH) units are derived from, for example, 2-mercaptoacetic acid, 2-mercaptopropionic acid, 3-mercaptopropionic acid, 4-mercaptobutyric acid, 5-mercaptopentanoic acid, or 6-mercaptohexanoic acid. Preferred are 2-mercaptopropionic acid and 3-mercaptopropionic acid.

Examples of cores of differential reactivity include pentaerythritol bis(3-mercaptopropionate) bis(2-mercaptopropionate); trimethylolpropane bis(3-mercaptopropionate)(2-mercaptopropionate); pentaerythritol tris( 3-mercaptopropionate)(2-mercaptopropionate); and trimethylolpropane bis(2-mercaptopropionate) (3-mercaptopropionate).

Cores of non-differential reactivity, or homocores, include pentaerythritol tetrakis(3-mercaptopropionate), trimethylolpropane trithiopropionate, tri(3-mercapto propionate), pentaerythritol tetrakis(thioglycolate) and dipentaerythritol hexakis thioglycolate.

In general, the polyvalent mercaptan core is prepared by reacting a multi-functional alcohol with the appropriate amount of mercapto acid to prepare the polyvalent mercaptan core. For example, if the multifunctional alcohol is a tri-alcohol, three equivalents of mercapto acid are added to give three (HS—Y) units. The three equivalents of mercapto acid can be made up of any combination of the preferred mercapto acids. For example, one equivalent of 2-mercaptopropionic acid (a secondary thiol-containing acid) and two equivalents of 3-mercaptopropionic acid (a primary thiol-containing acid) will provide a core of differential reactivity. If the alcohol is a trialcohol and three equivalents of 2-mercaptopropionic acid are used, a homocore within the scope of the present invention is also obtained.

In a specific example, pentaerythritol can be used as the multifunctional alcohol, X, used to prepare the core. To pentaerythritol is added two mole equivalents each of a primary thiol, 3-mercaptopropionic acid, and a secondary thiol, 2-mercaptopropionic acid. The result will be a mixture of five compounds corresponding to molecules containing ratios of primary/secondary SH groups of 0/4, 1/3, 2/2, 3/1, and 4/0. Those cores with ratios of 1/3, 2/2 and 3/1 have differential reactivity and are within the scope of the present invention. The cores with 0/4 and 4/0 are homocores. The product mixture, though a statistical mixture, has cores with an average of two primary thiol groups and two secondary thiol groups per core as shown by the following reaction:

The reaction is shown below:

PENTAERYTHRITOL    3-MERCAPTO-    3-MERCAPTO-
                   PROPIONIC ACID  PROPIONIC ACID

Dual-Reactivity Core

With dipentaerythritol, seven possible compounds can be obtained corresponding to 0,1,2,3,4,5 and 6 primary SH groups per molecule. These differential thiols will be utilized to provide enhanced selectivity to generate heteroarm stars.

In an alternative embodiment, four mole equivalents of thiol can be added to pentaerythritol:

PENTAERYTHRITOL    3-MERCAPTO-
                   PROPIONIC ACID

HOMOCORE

The star polymers of the present invention are formed using the mercaptan core as a chain transfer agent in polymerization processes which include bulk, solution, emulsion, and suspension polymerization. Preferably the process is a solution polymerization process employing a free radical initiator. The polymerization reaction is typically conducted at temperatures in the range of 10 to 1 20° C., preferably 70 to 100° C.

The present invention contemplates that the resulting polymer may comprise arms that are all the same, or all the same after the S atom but with different Y connecting groups.

In one embodiment, the preparation of the star polymers of the present invention is by the non-sequential addition of monomers to the mercaptan core. In this embodiment, the core may be a core of differential reactivity, or a homocore. During the process of this embodiment, all of the monomers are added at the same time, i.e., a mixture of two or more monomers are added to the core. If the core is a core of differential reactivity, the monomers with the higher reactivity ratios in copolymerization will react with the most reactive thiol groups. If the core is a homocore, the mixture of monomers will react randomly leading to random polymeric arms on the resulting star polymer. With either embodiment, the polymerization is initiated by a mercapto group on the polyvalent mercaptan core. In general, the orders of reactivity of thiol groups are: SH groups attached to aromatic rings (i.e., thiophenols) are more reactive than SH groups attached to primary aliphatic carbon atoms which are more reactive than SH groups attached to secondary aliphatic carbon atoms, i.e., $ArSH>RCH_2SH>RR'CHSH$.

In the above embodiment, the monomer mixtures can be added by any method familiar to the skilled artisan including dropwise or by slug dose.

Monomers which may be used to prepare the polymeric arms of the star polymers of the present invention include olefinically unsaturated monomers in addition to a small amount of an olefinic monomer containing crosslinkable functionality such as alcohols, acids, isocyanates, epoxides and combinations thereof.

Examples of olefinically unsaturated monomers include those selected from the group consisting of acrylic and methacrylic acids, acrylamide and methacrylamide, acrylonitrile and methacrylonitrile, alkoxyalkyl acrylamides and methacrylamides, e.g., butoxymethyl acrylamide and methoxymethyl methacrylamide, hydroxyalkyl acrylamides and methacrylamides, e.g., N-methylol acrylamide and methacrylamide. Preferred are the esters and amides of acrylic and methacrylic acids with alcohols, phenols and amines; the vinyl aromatic compounds, e.g., styrene, alpha-methylstyrene and substituted derivatives thereof such as the halogenated derivatives thereof and vinyl toluene; the vinyl esters, vinyl amides, e.g., vinyl acetate and vinyl pyrrolidone; and ethylenically unsaturated nitriles and combinations thereof.

Monomers may be selected from hydroxyalkyl esters of ethylenically unsaturated carboxylic acids, ethylenically unsaturated carboxylic acids, ethylenically unsaturated epoxides, ethylenically unsaturated isocyanates and combinations thereof.

Other unsaturated monomers include hydroxypropyl (meth)acrylate, glycidyl (meth)acrylate, methoxyethyl (meth)acrylate, ethoxyethyl (meth)acrylate, ethoxyethoxyethyl (meth)acrylate, cyanoethyl acrylate and the like; vinyl ethers which are represented by methyl vinyl ether, ethyl vinyl ether, isobutyl vinyl ether, and the like; fumaric acid, monoalkyl fumarates, dialkyl fumarates; maleic acid, monoalkyl maleates, dialkyl maleates; itaconic acid, monoalkyl itaconates, dialkyl itaconates; half esters of succinic anhydride or phthalic anhydride with hydroxyethyl (meth)acrylate; (meth)acrylonitrile, butadiene, isoprene, vinyl chloride, vinylidene chloride, vinyl ketones, vinyl pyridine, vinyl carbazole, and the like. These compounds may be used either alone or in combinations with each other.

The present invention also contemplates the use of multifunctional monomers such as ethylene glycol di(meth)acrylate, trimethylolpropane tri(meth)acrylate, diethylene glycol di(meth)acrylate trisacrylate, divinyl benzene, triallyl cyanurate, allyl acrylate, diallyl phthalate, diallyl sucrose and allyl(meth)acrylate.

The preferred monomers are acrylic acid and methacrylic acid and derivatives such as esters and amides which have chain transfer constants with thiols that are close to one. Examples of such monomers are of the formula $CH_2=C(R)COOR'$ where R is H or methyl and R' is H or $C_{1-12}$ alkyl, $C_{5-10}$ cycloalkyl or $C_{6-10}$ aryl wherein the alkyl, cycloalkyl or aryl is optionally substituted with halo or hydroxy. Examples of such monomers include acrylic and methacrylic acid and esters of acrylic acid and methacrylic acid such as methyl acrylate, ethyl acrylate, n-butyl acrylate, 2-ethylhexyl acrylate, 2-hydroxyethyl acrylate, hydroxypropyl acrylate, isobornyl acrylate, methyl methacrylate, ethyl methacrylate, n-propyl methacrylate, isopropyl methacrylate, n-butyl methacrylate, isobutyl methacrylate, cyclohexyl methacrylate, isobornyl methacrylate, 2-ethylhexyl methacrylate, benzyl methacrylate, phenyl methacrylate, hydroxyethyl methacrylate and hydroxypropyl methacrylate. Also included are the $C_{1-18}$ alkyl esters of methacrylic acid.

In one embodiment, the alkyl acrylates will form a major essential constituent of the polymeric arms of the star polymer. Such alkyl acrylates are preferably acrylic acid esters of alcohols having up to about 18 carbon atoms. The preferred alkyl acrylates have an average of from about 4 to about 10 carbon atoms in the alkyl groups, and include butyl acrylate, amyl acrylate, hexyl acrylate, heptyl acrylate, octyl acrylate, nonyl acrylate, decyl acrylate, and various isomers of these acrylates, such as isooctyl acrylate. One specific preferred alkyl acrylate for use in the invention is 2-ethylhexyl acrylate. Higher alkyl acrylates can in some instances be used, particularly in combination with the lower alkyl acrylates, whereby the average number of carbon atoms in the alkyl groups is within the desired range.

Methyl methacrylate, 2-ethylhexyl acrylate, methyl acrylate, acrylic acid, butyl methacrylate, 2-hydroxyethyl acrylate, t-octyl acrylamide and butyl acrylate are the most preferred monomers.

The polymeric arms of the star polymer also include a small amount of an olefinic monomer containing crosslinkable functionality such as alcohols, acids, isocyanates, epoxides and combinations thereof. Examples of such monomers include, but are not limited to, hydroxyalkyl esters of ethylenically unsaturated carboxylic acids, ethylenically unsaturated carboxylic acids, ethylenically unsaturated epoxides and ethylenically unsaturated isocyanates.

The preferred olefinic monomers that are crosslinkable include the ethylenically unsaturated carboxylic acids. The preferred carboxylic acids are acrylic acid and methacrylic acid, but other copolymerizable acids such as crotonic acid, itaconic acid, and fumaric acid can also be employed. Other useful carboxylic acids include half esters of unsaturated dicarboxylic acids such as methyl hydrogen fumarate, butyl hydrogen fumarate, ethyl hydrogen maleate, and butyl hydrogen maleate. These agents may be present in amounts from about 0.2 percent up to about 20 percent by weight of the total weight of the star polymer. Preferred products contain from about 0.3 to about 10 percent by weight of such acids.

Other preferable olefinic monomers with crosslinkable functionality include hydroxyalkyl esters of ethylenically unsaturated acids. The preferred hydroxyalkyl esters are esters of acrylic acid, methacrylic acid, and other alpha-beta ethylenically unsaturated carboxylic acids. Examples include 3-hydroxyethyl acrylate, 2-hydroxpropyl acrylate, 3-hydroxypropyl acrylate, 2-hydroyethyl methacrylate, 2-hydroxpropyl methacrylate, 3-hyroxypropyl methacrylate, 4-hydroxybutyl methacrylate, and corresponding esters of other unsaturated acids. For example, methacrylic acid, crotonic acid, and similar acids of up to about six carbon atoms. There may also be employed mono- or di-esters of unsaturated dicarboxylic acids, such as maleic acid, fumaric acids, and itaconic acid in which at least one of the esterifying groups contains a hydroxyl group. Examples of such esters include mono(2-hydroxyethyl) maleate, mono(2-hydroxyethyl) fumarate, bis(2-hydroxyethyl) maleate, mono(2-hydroxypropyl) maleate, bis(2-hydroxypropyl) maleate, mono(2-hydroxyethyl) itaconate, bis(2-hydroxyethyl) itaconate, and 2-hydroxyethylbutyl maleate.

A preferred ethylencially unsaturated epoxide is glycidyl (meth)acrylate, ("GMA").

A preferred ethylencially unsaturated isocyanate is 1-(1-isocyanato-1-methyl ethyl)-3-(1-methyl ethenyl)benzene ("m-TMI").

In one embodiment of the present invention, the arms of the star polymer are prepared from monomers consisting essentially of one or more alkyl acrylates, generally containing up to about 10 carbon atoms in the alkyl group, along with a small proportion of an acrylic monomer having crosslinkable functionality such as hydroxyalkyl esters of ethylenically unsaturated carboxylic acids, ethylenically unsaturated carboxylic acids, ethylenically unsaturated epoxides and ethylenically unsaturated isocyanates.

The polymeric arms also may include one or more other additional copolymerizable monomers devoid of any functional group except for the polymerizable ethylenic linkage. In many cases it may be desirable to have both copolymerizable monomers containing OH groups and those containing COOH groups in the composition simultaneously.

In addition, other acrylate monomers, such as methyl acrylate and methyl methacrylate, which are not considered tacky or pressure sensitive, may be used in combination with the acrylic monomers, or with the combination of acrylic and vinyl monomers, known to have pressure sensitivity. In pressure sensitive applications, combinations of acrylic and vinyl monomers known to have pressure sensitivity can be used. The total amount of the monomer will be such that the monomers known to impart pressure sensitivity will constitute at least about 50% by weight of the total copolymer.

The vinyl monomers that may be used in combination with the acrylic monomers include vinyl monomers selected from the group consisting of vinyl esters, vinyl ethers, vinyl halides, vinylidene halides, and nitrites of ethylenically unsaturated hydrocarbons, and include, vinyl acetate, vinyl ethyl ether, vinyl chloride, vinylidene chloride, and acrylonitrile.

There can also be included in the star polymer composition one or more other copolymerizable monomers which contain an ethylenically unsaturated linkage, such linkage being the only reactive functional group in the monomer. For example, there is often included a vinyl ester of a saturated carboxylic acid, such as vinyl acetate, vinyl propionate or vinyl butyrate. Other optional monomers which will copolymerize by addition reaction that can be employed include alkyl acrylates other than those above, and alkyl methacrylates having from 1 to 20 carbon atoms or more in the alkyl group, such as methyl methacrylate, butyl methacrylate, octadecyl methacrylate, lauryl methacrylate, and the like.

The exact relative amounts of the specific components making up the arms of the star polymers are dependent upon the final properties desired and the end uses contemplated, and are known in the art. The process of the present invention is adaptable to be used with all such pressure sensitive adhesives.

The combination of monomers used to make up the star polymer will be such as to provide a normally tacky pressure-sensitive material. Thus, the star polymer can include essentially any ethylenic monomer or mixture of monomers copolymerizable with the other components and which do not contain additional crosslinkable functionality and which do not, in combination with those components, provide unsatisfactory properties such as unsatisfactorily reduced tack. The term "crosslinkable functionality" herein refers to functional groups with which the multifunctional crosslinking agent reacts, such as hydroxyl, carboxyl, etc. Such other monomers can be of widely varying types, depending upon the specific alkyl acrylates, hydroxyalkyl esters, carboxylic acids, and other monomers in the star polymer. For instance, there can be utilized in certain cases mono-olefinic hydrocarbons, such as styrene and vinyl toluene; halogenated mono-olefinic hydrocarbons, such as vinyl chloride and vinylidene chloride; unsaturated esters, such as isopropenyl acetate and dimethyl maleate; and dienes, such as 1,3-butadiene.

When the polymeric arm is prepared from acrylic and methacrylic monomer units, the polymer arm of the resulting polymer comprises 10 to 1500 monomer units, preferably 20 to 500. When a mixture of monomers is used, the copolymer is a random copolymer of such units.

Free radical initiators suitable for use in the polymerization process of the present invention include, for example: azo-based polymerization initiators such as 2,2'-azobisisobutyronitrile ("AIBN") and 2,2'-azobis (cyclohexanecarbonitrile); peroxide-based polymerization initiators such as benzoyl peroxide; and the like. Other suitable initiators include organic peroxides, hydroperoxides, persulfates and azo compounds such as methyl ethyl ketone peroxide, cumene hydroperoxide, potassium persulfate, lauroyl peroxide, 2,5-dimethyl-2,5-di (t-butylperoxy)hexane, diethyl peroxide, dipropyl peroxide, dilauryl peroxide, dioleyl peroxide, distearyl peroxide, di(tertiary butyl) peroxide, di(tertiary amyl) peroxide, tertiary butyl hydroperoxide, tertiary amyl peroxide, acetyl peroxide, propionyl peroxide, lauroyl peroxide, stearoyl peroxide, malonyl peroxide, succinyl peroxide, phthaloyl peroxide, acetyl benzoyl peroxide, propionyl benzoyl peroxide, ascaridole, ammonium persulfate, sodium persulfate, sodium percarbonate, potassium percarbonate, sodium perborate, potassium perborate, sodium perphosphate, potassium perphosphate, tetralin hydroperoxide, tertiary butyl diperphthalate, tertiary butyl perbenzoate, 2,4-dichlorobenzoyl peroxide, urea peroxide, caprylyl peroxide, p-chlorobenzoyl peroxide, 2,2-bis (tertiary butyl peroxy)butane, hydroxyheptyl peroxide and dialkyl esters of peroxydicarbonate.

Whether or not the reaction will require a solvent will depend on the monomers and core selected. If the polymerization process is one which requires a solvent, as determined by one of skill in the art, a solvent can be selected from the group consisting of organic solvents which are represented by: aromatic hydrocarbons such as toluene and xylene; esters such as ethyl acetate and butyl acetate; cycloaliphatic hydrocarbons such as cyclohexane; aliphatic hydrocarbons such as hexane and pentane; ketones such as acetone, methyl ethyl ketone, and methyl isobutyl ketone; aliphatic esters; alcohols; and the like. Other suitable solvents include naphthalene, trichlorobenzene, dimethylformamide, and dimethylacetamide.

The star polymer, as described above, is reacted with a multifunctional crosslinking agent to provide the adhesive polymer employed in the invention.

Examples of multifunctional crosslinking agents include soluble metal compounds, polyisocyanates, polyaziridines or polyepoxides.

Preferred are the soluble metal compounds including those having valences of 2 to 5. For example, metal alkoxides such as those having the formula $R_nT(OR_1)_z$, wherein T is a metal selected from those having valences of 2 to 5, such as aluminum, titanium, zinc, tin and zirconium. R is selected from the group consisting of alkyl or alkoxy radicals of from 1 to 8 carbon atoms such as methyl, ethyl butyl, iso-octyl and the like, aryl radicals of from 6 to 16 carbon atoms such as benzyl, alkoxy radicals of from 1 to 8 carbon atoms, and moieties derived from beta-diketones such as acetyl acetonate. $R_1$ is selected from the group consisting of aliphatic and substituted aliphatic radicals containing from 1 to 18 carbon atoms, such as alkyl groups, allyl groups and the like; n is an integer whose value is zero or greater and z is an integer of at least two, wherein the sum of n+z is greater than one (1) and is equal to the valence of the metal represented by T.

Examples of metal alkoxides for use in the practice of this invention include the following: aluminum acetylacetonate, magnesium ethoxide, calcium ethoxide, strontium ethoxide, barium ethoxide, aluminum ethoxide, aluminum isopropoxide, lanthanum t-butoxide, ferric ethoxide, ferric isopropoxide, titanium ethoxide, titanium isopropoxide, titanium butoxide, cupric isopropoxide, cobaltic isopropoxide, zinc isopropoxide, nickel isopropoxide, zirconium ethoxide, zirconium isopropoxide, zirconium butoxide, hafnium ethoxide, hafnium isopropoxide, cerium isopropoxide, germanium isopropoxide, stannic ethoxide, stannic isopropoxide, vanadium isopropoxide, chromium t-butoxide, niobium ethoxide, niobium isopropoxide; also included are double alkoxides such as sodium zirconium isopropoxide, potassium zirconium ethoxide, magnesium aluminum ethoxide, potassium aluminum butoxide, sodium stannic ethoxide and alkyl metal alkoxides such as diethoxy ethyl aluminum, dibutoxy diphenyl titanium, phenyl triisopropoxy titanium, dimethyl diisopropoxy titanium, dibutyl dimethoxy tin and the like.

The preferred metal alkoxides are aluminum isopropoxide or titanium esters such as alkyl titanates such as ortho titanic acid esters of monofunctional alcohols and tetraaryl esters. Examples of alkyl titanates include tetramethyl titanate, tetraethyl titanate, tetrapropyl titanate, tetraisopropyl titanate, tetrabutyl titanate, tetra-2-ethyl-hexyl titanate, and tetrastearyl titanate. As indicated, tetraphenyl titanate and other tetraaryl esters are also included.

The above alkoxides may be used if the acrylic monomer containing a COOH group is used as the olefinic monomer having crosslinkable groups. It has been found that the adhesives produced using these alkoxides and the acid monomers have excellent strength.

The metal alkoxides, including the lower alkyl titanates, have the disadvantage of being extremely reactive and have a tendency to gel in combination with the star polymer. The preferred metal alkoxide, chelated metal alkoxide, will solve any stability problems while retaining strength. Chelated esters are not subject to the storage disadvantages discussed above and provide formulated adhesives which can be stored for relatively long periods without substantial increase in viscosity.

The chelated metal alkoxides may be used where the olefinic monomer containing the crosslinkable functionality is either an OH or COOH containing monomer to achieve the improved strength and also the vastly improved shrink resistance and stability.

The preferred chelated metal alkoxides are chelated aluminum and titanium esters.

The chelated titanium esters which are employed in the preferred embodiment of the invention are formed by coordinate bonding between titanium or aluminum and electron donating atoms, such as oxygen or nitrogen. Thus, for example, the reaction of alkyl esters of titanic acid with amino alcohols, keto alcohols, glycols, or similar polyfunctional alcohols as the ligands, particularly acetyl acetone, causes replacement of at least two of the alkoxy groups of the ester with at least two moles of the ligand. Such chelated esters can be formed by various methods, such as by reaction of a tetraalkyl titanate with a glycol, such as 2-ethyl-1,3-hexanediol; a diketone, such as 2,4-pentanedione; a hydroxy acid, such as lactic acid, citric acid, or tartaric acid; a keto ester, such as acetoacetic ester; or with an aminoalcohol, such as diethanolamine or triethanolamine. The preparation of such chelated esters is by conventional means which will be familiar to one of skill in the art. Examples of chelated aluminum esters include aluminum trisacetylacetonate and chelated titanium esters including TYZOR AA and TYZOR GBA, isopropoxy acetylacetonates available from DuPont.

The preferred chelated esters employed in the invention are those which are commercially available, which include those formed from octylene glycol, triethanolamine, 2,4-pentanedione, and lactic acid. Thus chelated compounds such as titanium acetylacetonate, when added to the interpolymer solution forms a more stable, latently crosslinkable solution, which upon evaporation of solvent forms a crosslinked polymer matrix.

Examples of other chelated metal oxides can be found in U.S. Pat. No. 3,769,254 which is incorporated herein by reference.

There can also be included in the adhesive composition additive materials which do not affect the basic properties of the adhesive. Fillers, tackifiers, antioxidants, stabilizers, and the like are thus sometimes added to the formulated adhesive.

The present invention is also directed to a coated article comprising the pressure sensitive adhesive composition of the present invention and also a coated article comprising a pressure sensitive adhesive prepared according to the process of the present invention.

The adhesive can be employed in various forms. For instance, it can be cast as a free film interleaved between sheets of release paper and employed in a transfer operation. In other methods of utilization, the adhesive is coated onto a backing member and dried to provide pressure-sensitive adhesive coated materials, such as tapes, sheets or panels. Alternatively, the adhesive may be coated on to a release material and then dried and transferred to a backing member. Cellophane, vinyls, cloth, polyester, rubber, various laminates, and other such flexible materials, as well as wood, metal, hardboard and other less flexible backings, can be coated in this manner. The adhesive of this invention is useful in any application where pressure sensitive adhesives are used. In some cases, the adhesive can be used as a liquid adhesive and applied just prior to use.

In any event, the dried adhesive composition forms a tacky adhesive which adheres to various substrates to provide a bond of high cohesive strength, thus, making these adhesives especially desirable in uses where holding ability and retention of strength over a period of time are necessary.

The following examples are merely illustrative of the present invention and not intended to limit the scope of the claims in any manner.

EXAMPLES

The following test procedures were used in the examples:

Solution viscosities were determined on a Brookfield Model RVT viscometer operated at 25 rpm and 22° C.

The peel strength was measured from stainless steel panels in accordance with the Pressure Sensitive Tape Council ("PSTC"), Chicago, Ill. Test Method No. 1. Here, "initial" peel represents a bonded time lapse of 20 minutes rather than the specified 1 minute. "24 hrs OP" indicates a bonded time lapse of 24 hours and is indicative of the tendency for peel strength to increase with time after bonding. The test strip backing is 0.002 inch thick PET (polyethylene terephthalate) film and the dry adhesive coating weight is 25 g/m². The dry adhesive coatings are preconditioned overnight and then tested at 22° C. and 50% R.H. The average test results are recorded in units of ounces per inch width.

The shear test is conducted in accordance with PSTC Test Method No. 7. The coating preparation, preconditioning and test conditions are the same as for the peel test. Fifteen minutes elapsed time after bonding is allowed before attaching the load. A 1 kg weight is used on one square inch of bonded area giving 4.4 psi (nominally indicated as 4 psi in the Tables). The average time to failure is recorded in hours.

Dynamic Mechanical Analysis: The temperature spectrum of linear viscoelastic properties for the dry adhesive film is determined at 10 radians/second over the range from −70° to +190° C. using a Rheometrics Model RDA700 rheometer.

Example I

A mixture of acrylates in the ratio of 65 parts 2-ethylhexyl acrylate ("EHA"), 27.5 parts t-octyl acrylamide ("tOA") and 7.5 parts acrylic acid ("AA") were polymerized in the presence of 0.65 parts polymercaptan to yield a star polymer. Two different polymercaptans were used, trimethylolpropane tris(3-mercaptopropionate) ("3-arm"), and pentaerythritol tetrakis( 3-mercaptopropionate) ("4-arm"). For comparison, the same monomer composition was polymerized in the presence of a equivalent amount of linear methyl 3-mercaptopropionate to prepare a linear control. The reagents and procedure for preparation of each sample were as described below.

| Materials | Weight (g) |
|---|---|
| Monomer Mix: | |
| 2-Ethylhexyl acrylate | 65 |
| t-Octyl acrylamide | 27.5 |
| Acrylic acid | 7.5 |
| Polymercaptan | 0.65 |
| Initial Charge: | |
| Monomer mix | 33.3 |
| Ethyl acetate | 21.7 |
| Monomer Slow Add: | |
| Monomer mix | 45 |
| Initiator Slow Add: | |
| Ethyl acetate | 6.0 |
| 2,2'-Azobisisobutyronitrile | 0.5 |

The monomer mix was prepared and thoroughly mixed. The initial charge was charged to a 3000 mL reaction flask, equipped with a condenser, paddle stirrer, thermometer, addition funnels and water bath. The initial charge was heated to reflux and held for five minutes. At reflux, add very slowly 50% by volume of initiator solution to the flask contents. After 10 minutes hold, monomer and initiator were slow added continuously and uniformly over three hours while maintaining reflux. At the end of slow adds, the flask contents were held at reflux for two hours. The contents were cooled to 25° C. and analyzed, and the results shown below.

TABLE I

| Sample | 1-A | 1-B | 1-C | 1-D |
|---|---|---|---|---|
| Polymercaptan | linear | 3-arm | 4-arm | 4-arm |
| Final Solids (%) | 40 | 40 | 40 | 37.5 |
| Final Viscosity (cps) | 29,500 | 2,600 | 1,200 | 3,400 |
| TYZOR GBA | 2.0% | 2.0% | 2.0% | 2.0% |
| Coat Wt. (lbs/ream) | 16.3 | 18.4 | 16.7 | 17.3 |
| Peel, 20 min, @RT (oz/in) avg | 32 | 47 | 42 | 37 |
| Peel, 24 hrs OP@RT (oz/in) avg | 49 | 54 | 54 | 47 |
| Shear, 4PSI (hr) avg | 192+ | 192+ | 192+ | 192+ |
| Loop Tack (oz/in²) avg | 47 | 69 | 58 | 43 |

As can be seen in the results shown in Table I, the star polymers, samples 1-B, 1-C and 1-D, all have substantially lower viscosity than the linear polymer of same composition at similar polymer concentration of 40%. Additionally the viscosity of the 4-arm radial polymer, sample 1-C, is lower than the 3-arm radial polymer, sample 1-B, at the same polymer concentration.

In addition, the star polymers, samples 1-B, 1-C and 1-D, all show good balance of PSA performance and in some cases better than the linear polymer.

Example II

A mixture of acrylates in the ratio of 70 parts 2-ethylhexyl acrylate, 27.5 parts t-octyl acrylamide and 2.5 parts acrylic acid were polymerized in the presence of 0.65 parts tetrafunctional polymercaptan, pentaerythritol tetrakis(3-mercaptopropionate) to yield a star polymer. The reagents and procedure for preparation of each sample were as described below.

| Materials | Weight (g) |
|---|---|
| Monomer Mix: | |
| 2-Ethylhexyl acrylate | 70 |
| t-Octyl acrylamide | 27.5 |
| Acrylic acid | 2.5 |
| Polymercaptan | 0.65 |
| Initial Charge: | |
| Monomer mix | 33.3 |
| Ethyl acetate | 21.7 |
| Monomer Slow Add: | |
| Monomer mix | 45 |
| Initiator Slow Add: | |
| Ethyl acetate | 6.0 |
| 2,2'-Azobisisobutyronitrile | 0.5 |

The monomer mix was prepared and thoroughly mixed. The initial charge was charged to a 3000 mL reaction flask, equipped with a condenser, paddle stirrer, thermometer, addition funnels and water bath. The initial charge was heated to reflux and held for 5 minutes. At reflux, add very slowly 50% by volume of initiator solution to the flask contents. After 10 minutes hold, monomer and initiator were slow added continuously and uniformly over three hours while maintaining reflux. At the end of slow adds, the flask contents were held at reflux for two hours. The contents were cooled to 25° C. and analyzed, and the results shown below. Other monomers and reagents were also prepared by the above method and these results also shown in Table II below.

TABLE 2

|  | 101A | 101B | 101C | 106A | 106B | 106C | 111A | 111B | 111C | 101C | 106C | 111C |
|---|---|---|---|---|---|---|---|---|---|---|---|---|
| 2-EHA | 65 | 65 | 65 | 65 | 67.5 | 70 | 65 | 67.5 | 70 | 65 | 70 | 70 |
| MA | 27.5 | 30 | 32.5 |  |  |  |  |  |  | 32.5 |  |  |
| methylmethacrylate, MMA |  |  |  | 27.5 | 27.5 | 27.5 |  |  |  |  | 27.5 |  |
| tOA |  |  |  |  |  |  | 27.5 | 27.5 | 27.5 |  |  | 27.5 |
| AA | 7.5 | 5 | 2.5 | 7.5 | 5 | 2.5 | 7.5 | 5 | 2.5 | 2.5 | 2.5 | 2.5 |
| polymercaptan | 0.65 | 0.65 | 0.65 | 0.65 | 0.65 | 0.65 | 0.65 | 0.65 | 0.65 | 0.65 | 0.65 | 0.65 |
| Final Solids (%) | 50 | 50 | 50 | 50 | 50 | 50 | 50 | 50 | 50 | 50 | 50 | 50 |
| Final Viscosity (%) | 425 | 350 | 275 | 525 | 362 | 250 | 425 | 275 | 225 | 275 | 250 | 225 |
| AlAcAc/2,4PD/Toluene* | 1.6% | 1.6% | 1.6% | 1.6% | 1.6% | 1.6% | 1.2% | 1.2% | 1.2% | 1.2% | 1.2% | 1.4% |
| Coat Wt (lbs/ream) | 17.2 | 17.4 | 16.1 | 17.9 | 17.5 | 16.4 | 16.1 | 17.1 | 16.2 | 16.4 | 16.4 | 17.2 |
| Peel, 20 min, @RT (oz/in) avg | 30.5 | 22.5 | 17 | 6 | 33 | 24.5 | 5.5 | 9.5 | 57 | 28.5 | 37 | 43.5 |
| Peel, 24 hrs OP@RT (oz/in) avg | 44.5 | 36 | 29 | 6 | 52 | 45 | 4 | 10.5 | 60.5 | 39.5 | 43.5 | 53 |
| Shear, 4PSI (hr) avg | 280 | 280 | 280 | 280 | 280 | 280 | 136.5 | 53.8 | 23.1 | >50 | >50 | 51.9 |
| Loop Tack (oz/in$^2$) avg | 30 | 36 | 10 | 4 | 8.5 | 17.5 | 0 | 8 | 43 | 29.5 | 28 | 57 |

*AlAcAc = aluminum acetylacetonate
2,4PD = 2,4 pentanedione

Figure 1:
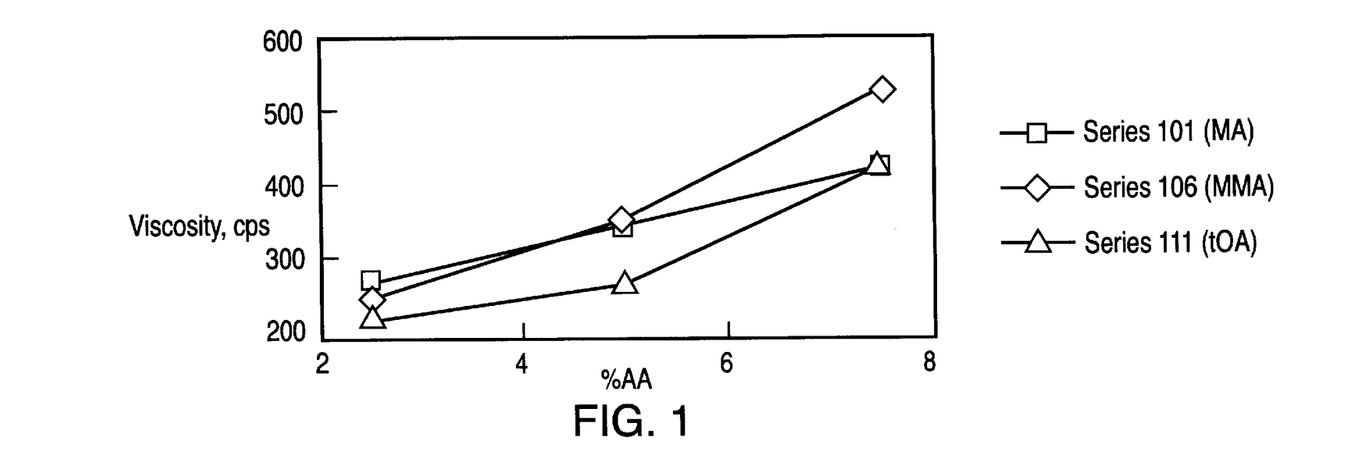
FIG. 1 is a graph of viscosity as a function of percent acrylic acid.
Figure 2:
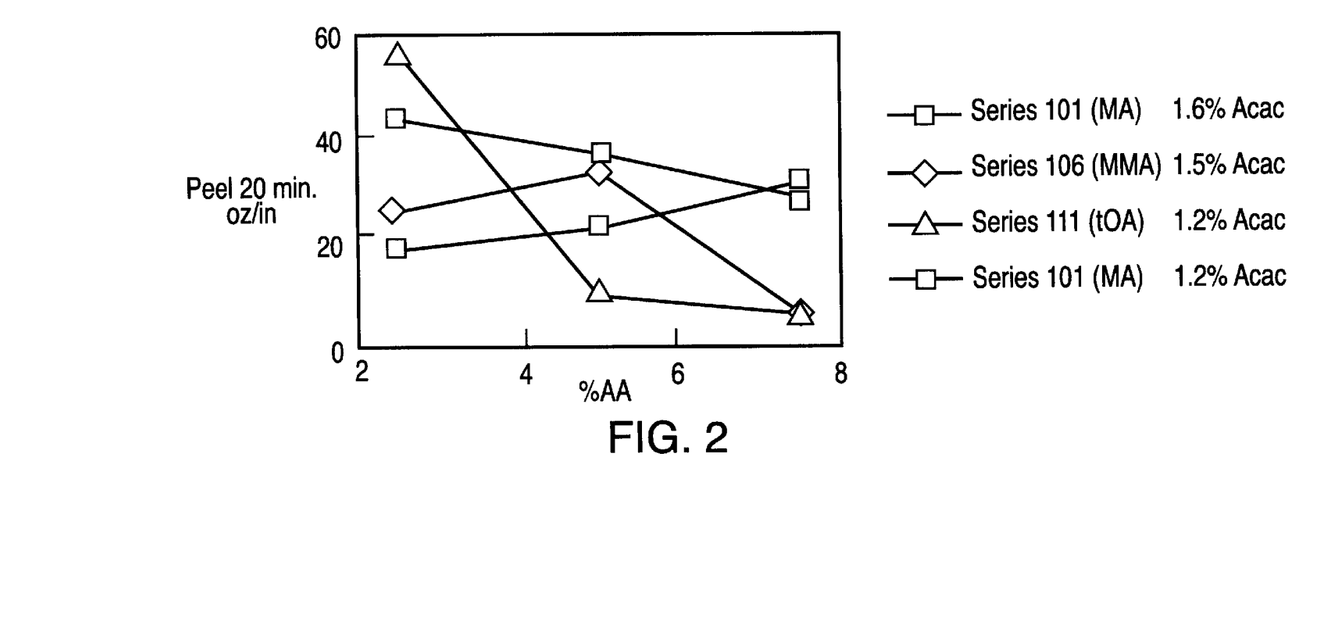
FIG. 2 is a graph of 20 minute peel as a function of percent acrylic acid.
Figure 3:
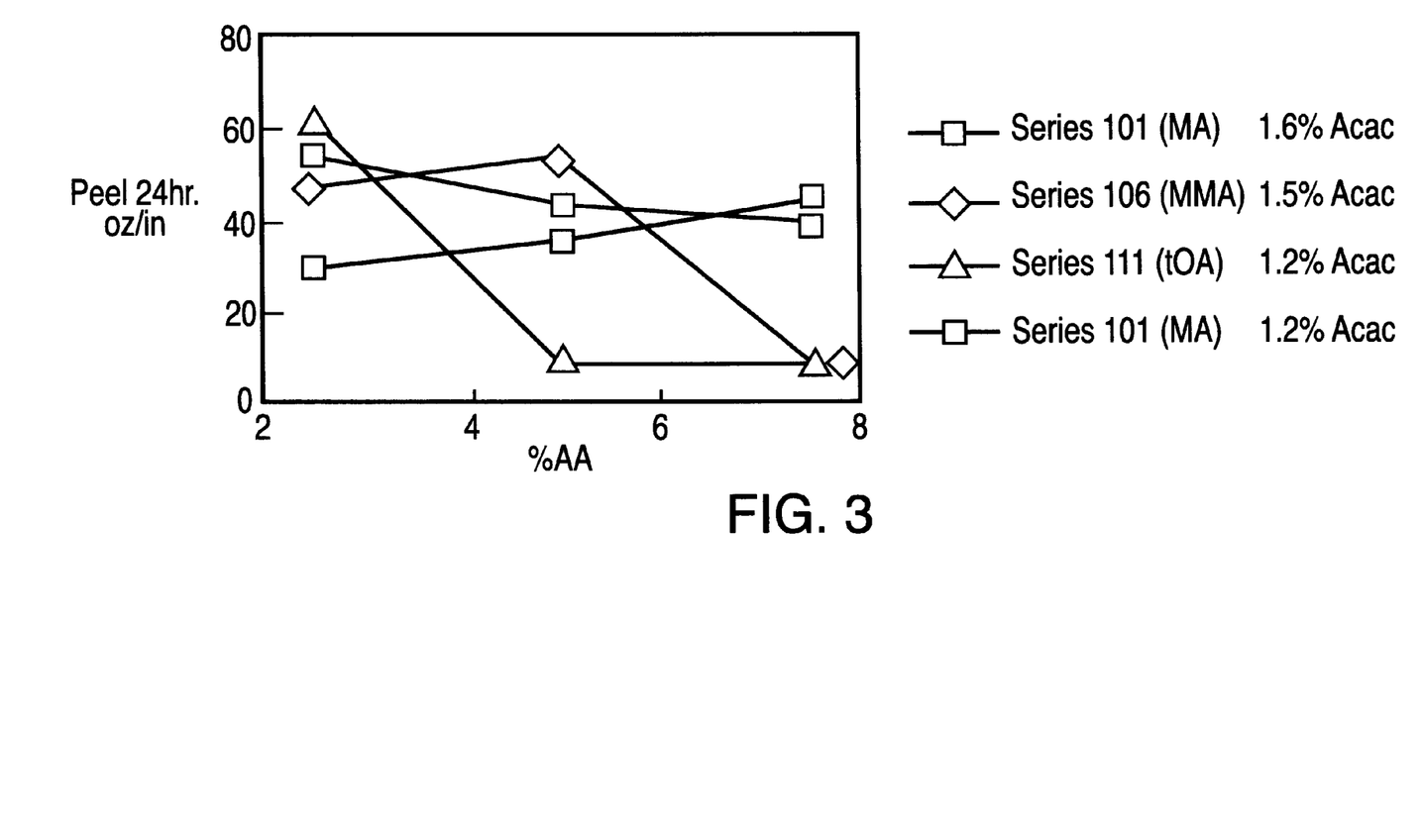
FIG. 3 is a graph of 24 hour peel as a function of percent acrylic acid.
Figure 4:
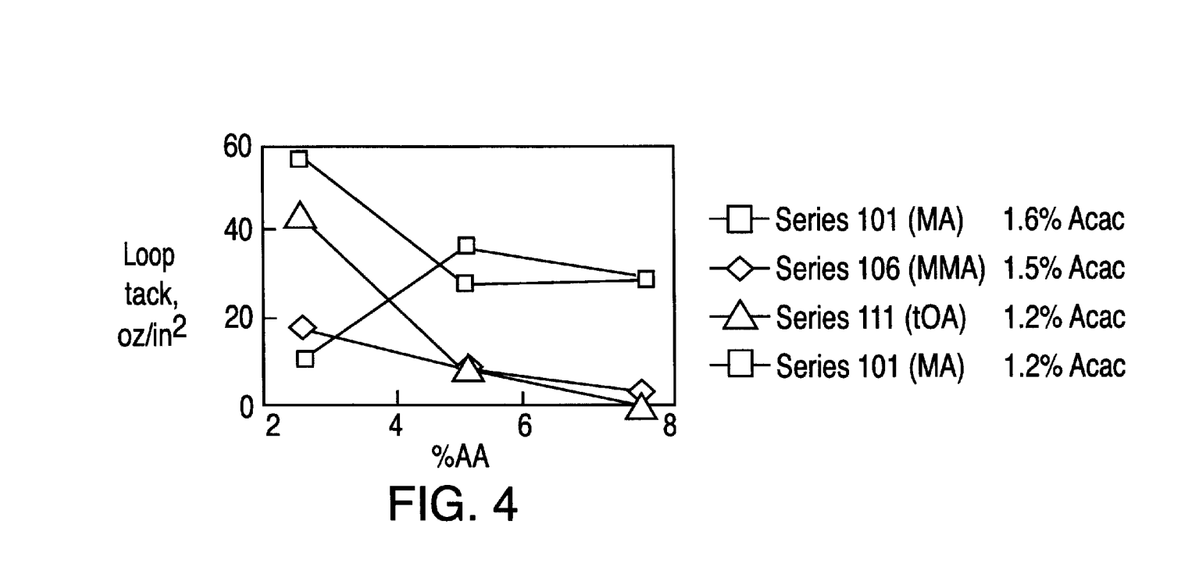
FIG. 4 is a graph of loop tack as a function of percent acrylic acid.
Figure 5:
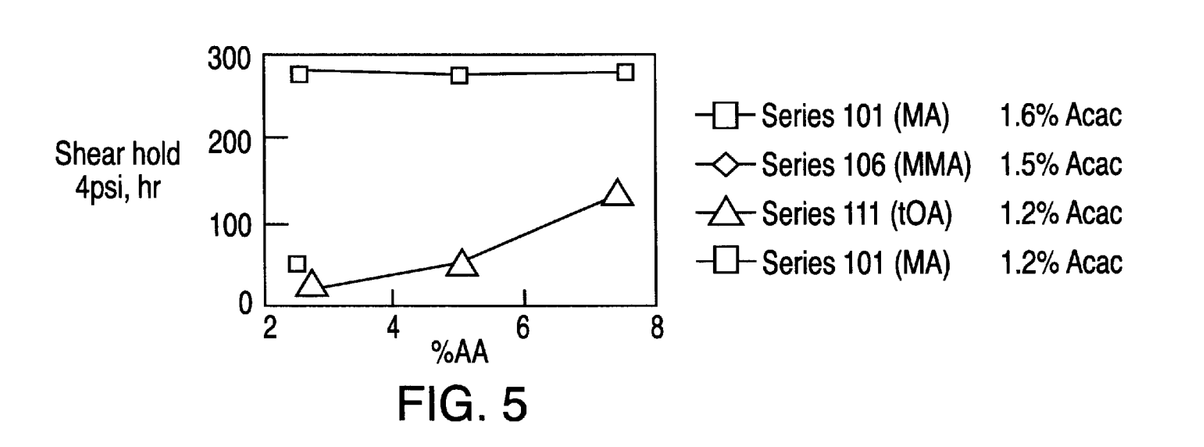
FIG. 5 is a graph of shear hold as a function of percent acrylic acid.

Viscosity, peel, shear and loop tack were plotted against percent acrylic acid, and the results shown in FIGS. 1–5. FIG. 1 indicates that tOA gives the lowest viscosity and that in general, viscosity increases with an increase in acrylic acid content. FIG. 2 shows 20 minute peel as a function of acrylic acid content. In general, peel decreases with increase in acrylic acid content, although sometimes a maximum is seen such as with the 106 series containing methyl methacrylate. The steepest decline in peel is seen in the 111 series which contains tOA. However in all cases, peel values are in the range of 20 to 60 oz/inch. FIG. 3 shows 24 hour peel, and the tends are exactly the same as in FIG. 2, however the peel values are all higher indicating a build up with time. FIG. 4 shows loop tack values for all the samples. FIG. 5 shows the shear holds for the same polymer.

Example III

A mixture of acrylates in the ratio of 70 parts 2-ethylhexyl acrylate, 27.5 parts t-octyl acrylamide and 2.5 parts acrylic acid were polymerized in the presence of 0.65 parts tetrafunctional polymercaptan pentaerythritol bis(2-mercaptopropionate) bis(3-mercaptopropionate), to yield a heterocore star polymer. For comparison, the same monomer composition was polymerized in the presence of equimolarly substituted linear methyl 3-mercaptopropionate to provide a linear control polymer. The reagents and procedure for preparation of each sample were as described below.

| Materials | Weight (g) |
|---|---|
| Monomer Mix: | |
| 2-Ethylhexyl acrylate | 700 |
| t-Octyl acrylamide | 275 |
| Acrylic acid | 25 |
| Polymercaptan | 6.5 |
| Initial Charge: | |
| Monomer mix | 335.5 |
| Ethyl acetate | 217 |
| Monomer Slow Add: | |
| Monomer mix | 671 |
| Initiator Slow Add: | |
| Ethyl acetate | 60 |
| 2,2'-Azobisisobutyronitrile | 5 |
| Total Weight | 1288.5 |
| Theoretical Solids | 78.5 |

The monomer mix was prepared and thoroughly mixed. The initial charge was charged to a 3000 mL reaction flask, equipped with a condenser, paddle stirrer, thermometer, addition funnels and water bath. The initial charge was heated to reflux and held for five minutes. At reflux, very slowly add 50% by volume of initiator solution to the flask contents. After 10 minutes hold, monomer and initiator were slow added continuously and uniformly over three hours while maintaining reflux. At the end of slow adds, the flask contents were held at reflux for two hours. The contents were cooled to 25° C. and analyzed for residual monomers, percent solid, intrinsic viscosity and molecular weight, and the results shown below.

TABLE 3

| Sample | 3-A | 3-B |
|---|---|---|
| Type of Polymer | Heterocore | Linear |
| B.F. Visc. @ 24° C. | 35,000 cps | 103,000 cps |
| Solids (%) | 77.45 | 77.66 |
| Coating thickness | 1.5 mil | 1.5 mil |
| Substrate | 2 mil PET | 2 mil PET |
| TYZOR GBA | 2% | 2% |
| Peel, initial, 20 min @ RT (oz/in) | 55 | 42 |
| Peel, 24 hrs OP @ RT (oz/in) | 84 | 59 |
| Shear, 4PSI @ RT (hr) | 4.5 | 40 |

Example IV

The thermo mechanical properties of star polymers of the present invention, prepared according to Examples 1, 2 and 3, were analyzed by Dynamic Mechanic Analysis ("DMA"). All of these polymers showed a single Tg value. For comparison, star polymers were prepared according to U.S. Pat. No. 5,679,762 and analyzed by DMA. The polymers prepared according to the reference showed two Tg values and phase separation.

We claim:

1. A pressure sensitive adhesive composition comprising a random star polymer with crosslinkable functionality and a multifunctional crosslinking agent, the star polymer comprising: a mercaptan core and three or more polymer segments which extend radially from the mercaptan core wherein the mercaptan core is of the general formula:

wherein X is derived from an organic radical having a valence of 3 to 8; $Y_1, Y_2, Y_3, Y_4, Y_5, Y_6, Y_7$ and $Y_8$ are the same or different and each comprise $C_{2-10}$ alkanoic acids; a, b, c, d, e, f, g, h are integers from 0 to 8 provided that $a+b+c+d+e+f+g+h \leq 8$, and wherein said multifunctional crosslinking agent comprises soluble metal compounds selected from the group consisting of aluminum isopropoxide, titanium ester, chelated aluminum esters and chelated titanium esters.

2. The pressure sensitive adhesive of claim 1 wherein $b=c=d=e=f=g=h=0$.

3. The pressure sensitive adhesive of claim 1 wherein X is the residue of a tri- to octa-functional alcohol.

4. The pressure sensitive adhesive of claim 1 wherein X is a residue of glycerol, sorbitol, trimethylolpropane, pentaerythritol, dipentaerythritol, tripentaerythritol, and inositol.

5. The pressure sensitive adhesive of claim 1 wherein a and b are integers from 1 to 8, and c, d, e, f, g, h are integers from 0 to 8.

6. The pressure sensitive adhesive of claim 1 wherein the crosslinkable functionality is selected from the group consisting of alcohols, acids, isocyanates, epoxides and combinations thereof.

7. A pressure sensitive adhesive according to claim 1 wherein the polymer segments comprise monomers selected from the group consisting of the esters and amides of acrylic and methacrylic acids with alcohols, phenols and amines; the vinyl aromatic compounds, and substituted derivatives thereof, vinyl esters; vinyl amides, ethylenically unsaturated nitrites and combinations thereof.

8. The pressure sensitive adhesive of claim 7 wherein the polymer segments comprise monomers selected from the group consisting hydroxyalkyl esters of ethylenically unsaturated carboxylic acids, ethylenically unsaturated carboxylic acids, ethylenically unsaturated epoxides, ethylenically unsaturated isocyanates, ethylene glycol di(meth)acrylate, trimethylolpropane tri(meth)acrylate, diethylene glycol di(meth)acrylate trisacrylate, divinyl benzene, triallyl cyanurate, allyl acrylate, diallyl phthalate, diallyl sucrose and combinations thereof.

9. A process for preparing a pressure sensitive adhesive comprising
a) polymerizing a mercaptan core, one or more compatible monomers and one or more second monomers having crosslinkable functionality, wherein the core is of the general formula:

wherein X is derived from an organic radical having a valence of 3 to 8; $Y_1, Y_2, Y_3, Y_4, Y_5, Y_6, Y_7$ and $Y_8$ are the same or different and each comprise $C_{2-10}$ alkanoic acid; a, b ,c, d, e, f, g, h are integers from 0 to 8 provided that $a+b+c+d+e+f+g+h \leq 8$, and wherein the second monomers comprise crosslinkable functionality selected from the group consisting of alcohols, acids, isocyanates, epoxides and combinations thereof; and
b) adding to the polymer of step a) a multifunctional crosslinking agent, wherein said multifunctional crosslinking agent comprises soluble metal compounds selected from the group consisting of aluminum isopropoxide, titanium ester, chelated aluminum esters and chelated titanium esters.

10. The process of claim 9 wherein the second monomers are selected from the group consisting hydroxyalkyl esters of ethylenically unsaturated carboxylic acids, ethylenically unsaturated carboxylic acids, ethylenically unsaturated epoxides, ethylenically unsaturated isocyanates, ethylene glycol di(meth)acrylate, trimethylolpropane tri(meth)acrylate, diethylene glycol di(meth)acrylate, divinyl benzene, triallyl cyanurate, allyl acrylate, diallyl phthalate, diallyl sucrose, and mixtures thereof.

11. The process of claim 9 wherein the compatible monomers are selected from the group consisting of the esters and amides of acrylic and methacrylic acids with alcohols and phenols and amines; the vinyl aromatic compounds, and substituted derivatives thereof; vinyl esters; vinyl amides, ethylenically unsaturated nitrites and combinations thereof.

12. A process according to claim 9 wherein X is the residue of a tri- to octa-functional alcohol.

13. A process according to claim 9 wherein X is a residue of glycerol, sorbitol, trimethylolpropane, pentaerythritol, dipentaerythritol, tripentaerythritol, and inositol.

14. A coated article comprising the pressure sensitive adhesive composition of claim 1.

15. A coated article comprising a pressure sensitive adhesive prepared according to claim 9.

* * * * *